United States Patent
Mleczko et al.

(10) Patent No.: US 11,584,888 B2
(45) Date of Patent: Feb. 21, 2023

(54) TWO STEP PROCESS FOR CHEMICALLY RECYCLING PLASTIC WASTE

(71) Applicant: Anellotech, Inc., Pearl River, NY (US)

(72) Inventors: Leslaw Mleczko, Dormagen (DE); Raghava Dasarathy, New York, NY (US); Greg Coil, Stony Point, NY (US); Yu-Ting Cheng, Nanuet, NY (US); Collin Schmidt, St. Petersburg, FL (US); Jeff Whiting, Goshen, VT (US); Rocco Carabetta, East Longmeadow, MA (US); Terry Mazanec, Solon, OH (US)

(73) Assignees: ANELLOTECH, INC., Pearl River, NY (US); R PLUS JAPAN LIMITED, Tokyo (JP)

( * ) Notice: Subject to any disclaimer, the term of this patent is extended or adjusted under 35 U.S.C. 154(b) by 0 days.

(21) Appl. No.: 17/201,706

(22) Filed: Mar. 15, 2021

(65) Prior Publication Data
US 2022/0290053 A1 Sep. 15, 2022

(51) Int. Cl.
| | |
|---|---|
| *C10B 53/07* | (2006.01) |
| *C10G 1/10* | (2006.01) |
| *B01J 29/90* | (2006.01) |
| *B01J 38/04* | (2006.01) |
| *C10B 57/04* | (2006.01) |
| *C10G 11/05* | (2006.01) |
| *C10G 11/18* | (2006.01) |
| *C10G 11/22* | (2006.01) |

(52) U.S. Cl.
CPC .............. *C10B 53/07* (2013.01); *B01J 29/90* (2013.01); *B01J 38/04* (2013.01); *C10B 57/04* (2013.01); *C10G 1/10* (2013.01); *C10G 11/05* (2013.01); *C10G 11/182* (2013.01); *C10G 11/185* (2013.01); *C10G 11/22* (2013.01); *C10G 2400/20* (2013.01); *C10G 2400/30* (2013.01)

(58) Field of Classification Search
CPC ............ C10G 1/10; C10G 51/04; C10B 53/07
See application file for complete search history.

(56) References Cited

U.S. PATENT DOCUMENTS

| | | |
|---|---|---|
| 4,029,716 A | 6/1977 | Kaeding |
| 4,746,406 A | 5/1988 | Timmann |
| 4,851,601 A | 7/1989 | Fukuda et al. |
| 5,079,385 A | 1/1992 | Wu |
| 5,447,622 A | 9/1995 | Kerby et al. |
| 5,744,668 A | 4/1998 | Zhou et al. |

(Continued)

FOREIGN PATENT DOCUMENTS

WO  WO 2020/204707  * 10/2020 ............... C10G 1/02

OTHER PUBLICATIONS

Huber, G.W et al., "Synthesis of Transportation Fuels from Biomass: Chemistry, Catalysts, and Engineering," Chem. Rev. 106, (2006), pp. 4044-4098.

*Primary Examiner* — Renee Robinson
(74) *Attorney, Agent, or Firm* — Frank Rosenberg (57) ABSTRACT

A two-step process that includes a pyrolytic first step carried out in a mechanically or gravitationally impelled reactor and a catalytic fluid bed second step that upgrades the resulting vapor, for the conversion of waste plastics, polymers, and other waste materials to useful chemical and fuel products such as paraffins, olefins, and aromatics such as BTX is described.

23 Claims, 2 Drawing Sheets

(56) References Cited

U.S. PATENT DOCUMENTS

| | | |
|---|---|---|
| 6,797,155 B1 | 9/2004 | Chester et al. |
| 8,895,790 B2 | 11/2014 | Narayanaswamy et al. |
| 9,040,761 B2 | 5/2015 | Bartek et al. |
| 9,212,318 B2 | 12/2015 | Narayanaswamy et al. |
| 9,428,695 B2 | 8/2016 | Narayanaswamy et al. |
| 10,233,395 B2 | 3/2019 | Ward et al. |
| 2011/0163002 A1 | 7/2011 | White et al. |
| 2016/0264874 A1 | 9/2016 | Narayanaswamy et al. |
| 2016/0264885 A1 | 9/2016 | Narayanaswamy et al. |
| 2016/0289569 A1 | 10/2016 | Baird et al. |
| 2017/0247617 A1 | 8/2017 | Schenk et al. |

\* cited by examiner

TWO STEP PROCESS FOR CHEMICALLY RECYCLING PLASTIC WASTE

FIELD OF THE INVENTION

This invention relates to the conversion of waste plastics, polymers, and other waste materials to useful chemical and fuel products such as paraffins, olefins, and aromatics such as BTX in a two-step process that includes a pyrolytic first step and a second step that upgrades the resulting vapor.

INTRODUCTION

In 2018, plastics generation in the United States was 38.5 million tons, which was 13.1 percent of MSW generation. World-wide over 350 million tons of plastics were produced. Plastic recycling recovers scrap or waste plastic and reprocesses the material into useful products. However, since China banned the import of waste plastics the recycle rate in the US is estimated to have dropped to only 4.4%.

Plastic recycling is challenging due to the chemical nature of the long chain organic polymers and low economic returns. In addition, waste plastic materials often need sorting into the various plastic resin types, e.g. low density polyethylene (LDPE), high density polyethylene (HDPE), polypropylene (PP), polystyrene (PS), polyvinyl chloride (PVC), and polyethylene-terephthalate (PET) for separate recycling treatments. Pyrolytic and catalytic pyrolytic processes are known in which waste plastics are heated to produce products such as liquid oils, gases, and carbon black.

Plas-TCat™ is a catalytic fluid bed process using zeolite catalysts to convert polymer/plastic material, especially waste plastics that otherwise might be sent to a landfill or incinerator, to a mixed product of permanent gases, C2-C4 light olefins, C1-C4 light paraffins, and C5+ hydrocarbons including benzene, toluene, and xylenes ("BTX"), aromatic and non-aromatic naphtha range molecules, C11+ hydrocarbons, coke and char, and minor byproducts. Plastic mixtures that have relatively high hydrogen to carbon molar ratio, such as polyethylene (PE), polypropylene, polystyrene, and combinations thereof, can be converted to olefins and aromatics.

U.S. Pat. No. 4,746,406 to Timmann discloses a process for the pyrolytic reprocessing of plastic, rubber, or other hydrocarbon materials in which the resultant pyrolysis gas is brought in a cooling stage to a temperature just above the freezing point of water and to a pressure of approximately 0.8 to 1.4 bar of overpressure. The resultant condensate is then separated and heated to a normal storage temperature and the super atmospheric pressure on the condensate reduced to atmospheric pressure. The gas produced thereby comprising C1 to C4 hydrocarbon compounds is supplied to the pyrolysis process as special product gas. A substantial increase in the proportion of aromatic compounds in the pyrolysis gas is reported.

Narayanaswamy et al in U.S. Pat. No. 8,895,790 describe a single step process for converting plastics to olefins and aromatics by contacting a feed mixture with a fluid bed catalyst at 550 C or higher.

U.S. Pat. Appl. No. 2016/0289569 from Baird et al describes a process of pyrolyzing biomass to bio-oil, separating and upgrading the pyrolysis oil, deoxygenating the upgraded pyrolysis oil to obtain aromatic and paraffinic products, and further upgrading the paraffinic product by aromatization.

U.S. Pat. No. 10,233,395 to Ward relates to a process for converting mixed waste plastic (MWP) into petrochemicals wherein a MWP stream is fed to a pyrolysis reactor, converting said MWP into separated gaseous stream and liquid streams, and further separately processing the gaseous stream and the liquid stream.

Fukuda et al in U.S. Pat. No. 4,851,601, describe a process for pyrolyzing plastics in a tank reactor with an added solid to minimize materials sticking to the reactor wall, and reacting the vapors in a fixed bed catalytic reactor.

Bartek et al in U.S. Pat. No. 9,040,761 describe a process for pyrolyzing biomass and plastic in a fluidized bed of heat transfer material and reacting the products with a catalyst in a second reactor to produce a bio-oil.

SUMMARY

A method of producing olefinic and aromatic hydrocarbons from waste plastics is described comprising feeding a mixture of plastics to a two-stage process including a first stage in which the plastic mixture is pyrolyzed anaerobically and a second stage in which the vapor products of the first stage are catalytically reacted to produce olefins and aromatics.

In a first aspect, the invention provides a method of converting plastics to olefins, or aromatics, or a mixture of olefins and aromatics, comprising: feeding a polymer or mixture of polymers to a first pyrolysis reactor comprising a mechanically or gravitationally induced moving bed; anaerobically pyrolyzing the stream in the first reactor under conditions sufficient to produce a vapor raw product mixture comprising one or more olefins and paraffins; transferring the product vapors from the first pyrolysis reactor to a fluidized bed catalytic reactor where, in the presence of a catalyst, the vapor mixture is converted to a product vapor mixture; and recovering olefins or aromatics or some combination thereof from the product vapor mixture.

The inventive method may be further characterized by one or any combination of the following features: feeding a feed mixture comprising plastics to a pyrolysis reactor; wherein the feed mixture comprises plastics chosen from among polyethylene, polypropylene, polyesters, polyethylene terephthalate (PET), acrylonitrile-butadiene-styrene (ABS) copolymers, polyamide, polyurethane, polyethers, polycarbonates, poly(oxides), poly(sulfides), polyarylates, polyetherketones, polyetherimides, polysulfones, polyurethanes, polyvinyl alcohols, and polymers produced by polymerization of monomers, such as, for example, dienes, olefins, styrenes, acrylates, acrylonitrile, methacrylates, methacrylonitrile, diacids and diols, lactones, diacids and diamines, lactams, vinyl esters, block copolymers thereof, and alloys thereof; thermoset polymers such as, for example, epoxy resins; phenolic resins; melamine resins; alkyd resins; vinyl ester resins; unsaturated polyester resins; crosslinked polyurethanes; polyisocyanurates; crosslinked elastomers, including but not limited to, polyisoprene, polybutadiene, styrene-butadiene, styrene-isoprene, ethylene-propylene-diene monomer polymer; and mixtures thereof, wherein the feedstock comprises a mix of waste plastic chosen from among polyethylene terephthalate (PET), high density polyethylene (HDPE), polyvinyl chloride (PVC) or polyvinylidene (PVCD), low density polyethylene (LDPE), polypropylene (PP), polystyrene (PS), or mixed resins, or some combination thereof; wherein the feed stream of plastics is first heated to at least 200 C to achieve a molten state and filtered to remove solids; wherein the feed mixture is heated anaerobically to a temperature of between 250 and 300 C to at least partially decompose the polymers in the pyrolysis reactor; wherein the pyrolysis reactor is one or more moving bed, 1-screw extruder, two screw extruder, auger reactor, rotating kiln reactor, or a stepped grate reactor, or some combination thereof; wherein the first pyrolysis reactor comprises and inlet port and an exit port, the temperatures can be from 20° C. to 225° C., such as 20 to 100° C., or 20 to 50° C., at or near the inlet port, and the range of temperatures at the high temperature exit port can be from 300 C to 700° C., such as from 325 to 650° C., or from 350 to 600° C.; wherein the residence time of condensed phases in the first pyrolysis reactor, or in either reactor when there are more than one pyrolysis reactors (prior to the catalytic fluidized bed reactor), is at least 1, or at least 5, or at least 10, or at least 20, or at least 30, or from 1 to 60, or from 5 to 30, or from 10 to 30 minutes, wherein the pyrolysis reactor comprises two or more reactors in series; wherein the feed is heated to a temperature between 250 and 300° C. in the first pyrolysis reactor and the condensed phases are passed to a second pyrolysis reactor; wherein an inert gas is fed to the first pyrolysis reactor and the vapors are exhausted; wherein the non-vapor products of the pyrolysis reactor, or a portion of the gases remaining after removal of desired products, or both, are combusted to provide energy for the pyrolysis process; wherein a solid co-reactant material is fed to the pyrolysis reactor; wherein the solid co-reactant comprises one or more materials chosen from among agricultural lime, calcium oxide, calcium hydroxide, magnesium oxide, magnesium hydroxide, limestone, or hydrotalcites, or some combination thereof; wherein the solid co-reactant material is transferred to a combustion regenerator wherein the carbonaceous materials are reacted with air and at least a portion of the hot solid co-reactant material is returned to the fluidized bed pyrolysis reactor; wherein the hot vapor products produced in the pyrolysis reactor are transferred, without cooling or condensing a significant portion of the vapor products, to a catalytic pyrolysis reactor containing a catalyst; wherein the catalytic reactor is a fluidized bed reactor; wherein the catalytic reaction is conducted in a fluidized bed, circulating bed, bubbling bed, or riser reactor at an operating temperature in the range from 300° C. to 800° C., or from 350° C. to 750° C., or from 400° C. to 700° C., or from 450° C. to 650° C., or from 500° C. to 600° C.; wherein the pressure is at least 0.1 MPa (1 bar), or at least 0.3 MPa (3bar), or at least 0.4 MPa (4 bar), or from 0.1 to 2.0 MPa (1 to 20 bar), or from 0.1 to 1.0 MPa (1 to 10 bar), or from 0.3 to 0.8 MPa (3 to 8 bar), preferably from 0.4 to 0.6 MPa (4 to 6 bar); wherein the residence time of the vapors in the catalytic pyrolysis reactor can be from 1 second to 480 seconds, or from 1 second to 240 seconds, or from 2 seconds to 60 seconds, or from 3 seconds to 30 seconds, or from 4 seconds to 15 seconds; wherein the catalyst is a solid catalyst and the step of catalytically pyrolyzing comprises pyrolyzing in the presence of the solid catalyst in a fluidized bed reactor to produce a fluid product stream and used catalyst with coke, and wherein at least 95% the carbon in the feed is converted to coke and volatile products; wherein the catalyst comprises a zeolite; wherein the catalyst may be selected from naturally occurring zeolites, synthetic zeolites and combinations thereof; wherein the catalyst may be selected from ZSM-5, ZSM-11, ZSM-12, ZSM-22, ZSM-23, ZSM-35, ZSM-48, ZSM-50, or combinations thereof; wherein the product vapor mixture from the catalytic conversion comprises at least 20 mass % olefins, or at least 50 mass % olefins, in some embodiments in the range of 20 to 90 mass % olefins; wherein the catalyst composition comprises a crystalline molecular sieve characterized by an SAR from greater than 12 to 240 and a CI from 5 to 10; wherein the mass yield of olefins in the product vapor mixture from the catalytic conversion is at least 30%, or at least 40%, or at least 45%, or at least 50%, or at least 55%, or at least 60%, or from 20% to 90%, or from 30% to 70%, or from 45% to 60%, olefins based on the mass in the polymer feed; wherein the mass yield of BTX in the gaseous product mixture from the catalytic conversion is at least 30%, or at least 40%, or at least 45%, or at least 50%, or at least 55%, or at least 60%, or from 20% to 90%, or from 30% to 70%, or from 45% to 60%, BTX based on the mass in the polymer feed; wherein the vapor products of the catalytic pyrolysis are passed through one or more solids separation devices comprising a cyclone; wherein catalyst in the catalytic pyrolysis reactor is withdrawn and regenerated by oxidation with air, and returned to the catalytic pyrolysis reactor; wherein heat from the hot regenerated catalyst provides energy to the step of pyrolyzing; wherein at least a portion of the gases in the product mixture are combusted in the regenerator; wherein the gaseous catalytic pyrolysis product mixture is subjected to a separation process to produce a stream of gases enriched in CH4, CO, and H2; and passing at least a portion of the stream of gases enriched in CH4, CO, and H2 to the regenerator where they are combusted; wherein the gaseous catalytic pyrolysis product mixture comprises CH4 and C2-C4 paraffins; and wherein 50 to 100 mass % of the CH4 and C2-C4 paraffins is combusted in the regenerator.

There are many advantages of chemically recycling plastics by pyrolysis in a mechanically or gravitationally impelled reactor including: a mixture of any type of plastics is suitable, the plastic particles need not be ground to small size since the long residence time in the pyrolysis reactor or reactors ensures that the plastic pieces are heated to decomposition temperatures, the pyrolysis can be operated at high temperatures, vapor products can be readily separated from condensed phases within the pyrolysis reactor so that the vapors can be reacted in a catalytic reactor and the condensed phases can be regenerated and recycled or combusted, inorganic impurities in the plastic mixture are separated from the hydrocarbonaceous materials, and energy can be captured from the regeneration or combustion of the condensed phases for use in the process or for generating power.

Advantages of a two-step plastics upgrading process include: simple feeding system for vapors to the catalytic step, no danger of agglomeration in the fluidized bed causing defluidization or clumping in the bed, no need for good mixing of solid or molten plastic feed with catalyst particles, significantly narrower residence time distribution for pyrolysis gas in the catalytic reactor compared with the feed of solids, thus resulting in fewer heavy products, no carry-over of plastic particles into the catalyst regenerator, fewer external impurities transferred into the catalytic reactor, no inorganic particles embedded in the polymer like fillers or additives are transferred into the catalytic reactor (fillers are usually alkaline (basic) and when reacting with the acidic catalyst cause its deactivation), heat is convectively supplied to the plastics without the use of steam that causes deactivation (dealumination) of the catalyst, and a greatly reduced need for additional fluidization gas rendering product recovery simpler and less costly.

GLOSSARY

Aromatics—As used herein, the terms "aromatics" or "aromatic compound" are used to refer to a hydrocarbon compound or compounds comprising one or more aromatic groups such as, for example, single aromatic ring systems (e.g., benzyl, phenyl, etc.) and fused polycyclic aromatic ring systems (e.g., naphthyl, 1,2,3,4-tetrahydronaphthyl, etc.). Examples of aromatic compounds include, but are not limited to, benzene, toluene, indane, indene, 2-ethyl toluene, 3-ethyl toluene, 4-ethyl toluene, trimethyl benzene (e.g., 1,3,5-trimethyl benzene, 1,2,4-trimethyl benzene, 1,2,3-trimethyl benzene, etc.), ethylbenzene, styrene, cumene, methylbenzene, propylbenzene, xylenes (e.g., p-xylene, m-xylene, o-xylene, etc.), naphthalene, methyl-naphthalene (e.g., 1-methyl naphthalene, anthracene, 9.10-dimethylanthracene, pyrene, phenanthrene, dimethyl-naphthalene (e.g., 1,5-dimethylnaphthalene, 1,6-dimethylnaphthalene, 2,5-dimethylnaphthalene, etc.), ethyl-naphthalene, hydrindene, methyl-hydrindene, and dymethyl-hydrindene. Single-ring and/or higher ring aromatics may also be produced in some embodiments.

Fluid—The term "fluid" refers to a gas, a liquid, a mixture of a gas and a liquid, or a gas or a liquid containing dispersed solids, liquid droplets and/or gaseous bubbles. The terms "gas" and "vapor" have the same meaning and are sometimes used interchangeably. In some embodiments, it may be advantageous to control the residence time of the fluidization fluid in the reactor. The fluidization residence time of the fluidization fluid is defined as the volume of the reactor divided by the volumetric flow rate of the fluidization fluid under process conditions of temperature and pressure.

Fluidized Bed Reactor—The term "fluidized bed reactor" is given its conventional meaning in the art and is used to refer to reactors comprising a vessel that can contain a granular solid material (e.g., silica particles, catalyst particles, etc.), in which a fluid (e.g., a gas or a liquid) is passed through the granular solid material at velocities sufficiently high as to suspend the solid material and cause it to behave as though it were a fluid. Examples of fluidized bed reactors are described in "Fluidization Engineering" by D. Kunii and O. Levenspiel, Butterworth-Heinemann, 1991, incorporated herein by reference. The term "circulating fluidized bed reactor" is also given its conventional meaning in the art and is used to refer to fluidized bed reactors in which the granular solid material is passed out of the reactor, circulated through a line in fluid communication with the reactor, and recycled back into the reactor. Examples of circulating fluidized bed reactors are described in "Fluidization Engineering" by D. Kunii and O. Levenspiel, Butterworth-Heinemann, 1991.

Bubbling fluidized bed reactors and turbulent fluidized bed reactors are also known to those skilled in the art. In bubbling fluidized bed reactors, the fluid stream used to fluidize the granular solid material is operated at a sufficiently low flow rate such that bubbles and voids are observed within the volume of the fluidized bed during operation. In turbulent fluidized bed reactors, the flow rate of the fluidizing stream is higher than that employed in a bubbling fluidized bed reactor, and hence, bubbles and voids are not observed within the volume of the fluidized bed during operation. Examples of bubbling and turbulent fluidized bed reactors are described in Kirk-Othmer Encyclopedia of Chemical Technology (online), Vol. 11, Hoboken, N.J.: Wiley-Interscience, 2001, pages 791-825, incorporated herein by reference.

Olefins—The terms "olefin" or "olefin compound" (a.k.a. "alkenes") are given their ordinary meaning in the art, and are used to refer to any unsaturated hydrocarbon containing one or more pairs of carbon atoms linked by a double bond. Olefins include both cyclic and acyclic (aliphatic) olefins, in which the double bond is located between carbon atoms forming part of a cyclic (closed-ring) or of an open-chain grouping, respectively. In addition, olefins may include any suitable number of double bonds (e.g., monoolefins, diolefins, triolefins, etc.). Examples of olefin compounds include, but are not limited to, ethene, propene, allene (propadiene), 1-butene, 2-butene, isobutene (2 methyl propene), butadiene, and isoprene, among others. Examples of cyclic olefins include cyclopentene, cyclohexane, cycloheptene, among others. Aromatic compounds such as toluene are not considered olefins; however, olefins that include aromatic moieties are considered olefins, for example, benzyl acrylate or styrene.

Catalysts—Catalyst components useful in the context of this invention can be selected from any catalyst known in the art, or as would be understood by those skilled in the art. Catalysts promote and/or affect reactions. Thus, as used herein, catalysts lower the activation energy (increase the rate) of a chemical process, and/or improve the distribution of products or intermediates in a chemical reaction (for example, a shape selective catalyst). Examples of reactions that can be catalyzed include: dehydration, dehydrogenation, isomerization, hydrogen transfer, hydrogenation, polymerization, cyclization, desulfurization, denitrogenation, deoxygenation, aromatization, decarbonylation, decarboxylation, aldol condensation, and combinations thereof. Catalyst components can be considered acidic, neutral or basic, as would be understood by those skilled in the art.

For catalytic pyrolysis, particularly advantageous catalysts include those containing internal porosity selected according to pore size (e.g., mesoporous and pore sizes typically associated with zeolites), e.g., average pore sizes of less than about 10 ng, less than about 5 nm, less than about 2 nm, less than about 1 nm, less than about 0.5 nm, or smaller. In some embodiments, catalysts with average pore sizes of from about 0.5 nm to about 10 nm may be used. In some embodiments, catalysts with average pore sizes of between about 0.55 nm and about 0.65 nm, or between about 0.59 nm and about 0.63 nm may be used. In some cases, catalysts with average pore sizes of between about 0.7 nm and about 0.8 nm, or between about 0.72 nm and about 0.78 nm may be used.

In some preferred embodiments of catalytic pyrolysis, the catalyst may be selected from naturally occurring zeolites, synthetic zeolites and combinations thereof. In certain embodiments, the catalyst may be a ZSM-5 zeolite catalyst, as would be understood by those skilled in the art. Optionally, such a catalyst can comprise acidic sites. Other types of zeolite catalysts include: ferrierite, zeolite Y, zeolite beta, mordenite, MCM-22, ZSM-23, ZSM-57, SUZ-4, EU-1, ZSM-11, (S)AlPO-31, SSZ-23, among others. Zeolites and other small pore materials are often characterized by their Constraint Index. The Constraint Index approximates the ratio of the cracking rate constants for normal hexane and 3-methylpentane. The method by which Constraint Index is determined is described more fully in U.S. Pat. No. 4,029,716, incorporated by reference for details of the method.

Constraint Index (CI) values for some typical materials are:

TABLE 1

Constraint Indices of some common zeolites.

| Material | Constraint Index | Test Temp, ° C. |
|---|---|---|
| ZSM-4 | 0.5 | 316 |
| ZSM-5 | 6-8.3 | 371-316 |
| ZSM-11 | 5-8.7 | 371-316 |
| ZSM-12 | 2.3 | 316 |
| ZSM-20 | 0.5 | 371 |
| ZSM-22 | 7.3 | 427 |
| ZSM-23 | 9.1 | 427 |
| ZSM-34 | 50 | 371 |
| ZSM-35 | 4.5 | 454 |
| ZSM-48 | 3.5 | 538 |
| ZSM-50 | 2.1 | 427 |
| Mordenite | 0.5 | 316 |
| REY | 0.4 | 316 |
| Dealuminized Y | 0.5 | 510 |
| Beta | 0.6-2 | 316-399 |

The CI may vary within the indicated range of 1 to 12. Likewise, other variables such as crystal size or the presence of possibly occluded contaminants and binders intimately combined with the crystal may affect the CI. It is understood to those skilled in the art that the CI, as utilized herein, while affording a highly useful means for characterizing the molecular sieves of interest is approximate, taking into consideration the manner of its determination, with the possibility, in some instances, of compounding variable extremes. However, the CI will have a value for any given molecular sieve useful herein within the approximate range of 1 to 12.

In other embodiments, non-zeolite catalysts may be used; for example, WOx/ZrO2, aluminum phosphates, etc. In some embodiments, the catalyst may comprise a metal and/or a metal oxide. Suitable metals and/or oxides include, for example, nickel, palladium, platinum, titanium, vanadium, chromium, manganese, iron, cobalt, zinc, copper, gallium, and/or any of their oxides, among others. In some cases promoter elements chosen from among the rare earth elements, i.e., elements 57-71, cerium, zirconium or their oxides for combinations of these may be included to modify activity or structure of the catalyst. In addition, in some cases, properties of the catalysts (e.g., pore structure, type and/or number of acid sites, etc.) may be chosen to selectively produce a desired product.

Catalysts for other processes, such as alkylation of olefins, aromatization (hydrocarbon reforming), hydrogenation, hydrotreating, deoxygenation, denitrogenation, and desulfurization are well-known and can be selected for the olefin conversion or other processes described herein.

Plastics or Polymers—The terms "plastics" and "polymers" are used interchangeably herein. A polymer is a carbon-based (at least 50 mass % C) material chiefly made up of repeating units and having a number average molecular weight of at least 100, typically greater than 1000 or greater than 10,000. Polymers include thermoplastic polymers such as, for example, polyethylene, polypropylene, polyesters, polyethylene terephthalate (PET), acrylonitrile-butadiene-styrene (ABS) copolymers, polyamide, polyurethane, polyethers, polycarbonates, poly(oxides), poly(sulfides), polyarylates, polyetherketones, polyetherimides, polysulfones, polyurethanes, polyvinyl alcohols, and polymers produced by polymerization of monomers, such as, for example, dienes, olefins, styrenes, acrylates, acrylonitrile, methacrylates, methacrylonitrile, diacids and diols, lactones, diacids and diamines, lactams, vinyl halides, vinyl esters, block copolymers thereof, and alloys thereof, thermoset polymers such as, for example, epoxy resins; phenolic resins; melamine resins; alkyd resins; vinyl ester resins; unsaturated polyester resins; crosslinked polyurethanes; polyisocyanurates; crosslinked elastomers, including but not limited to, polyisoprene, polybutadiene, styrene-butadiene, styrene-isoprene, ethylene-propylene-diene monomer polymer; and blends thereof. Mixtures of polymers separated from municipal solid waste or other waste streams are suitable feeds provided they contain only small fractions of contaminants such as S, N, O, or halogens. Polymers yielding halogenated material upon pyrolysis, for example, polyvinyl chloride (PVC), polytetrafluoroethylene (PTFE), and other halogenated polymers, are generally minimized or excluded from the feed materials useful in this invention.

Pyrolysis—The terms "pyrolysis" and "pyrolyzing" are given their conventional meaning in the art and are used to refer to the transformation of a compound, e.g., a solid hydrocarbonaceous material, into one or more other substances, e.g., volatile organic compounds, gases and coke, by heat, preferably without the addition of, or in the absence of, $O_2$. Preferably, the volume fraction of $O_2$ present in a pyrolysis reaction chamber is 0.5% or less. Pyrolysis may take place with or without the use of a catalyst. "Catalytic pyrolysis" refers to pyrolysis performed in the presence of a catalyst, and may involve steps as described in more detail below. Example of catalytic pyrolysis processes are outlined, for example, in Huber, G. W. et al, "Synthesis of Transportation Fuels from Biomass: Chemistry, Catalysts, and Engineering," Chem. Rev. 106, (2006), pp. 4044-4098.

Selectivity—The term "selectivity" refers to the amount of production of a particular product in comparison to a selection of products. Selectivity to a product may be calculated by dividing the amount of the particular product by the amount of a number of products produced. For example, if 75 grams of aromatics are produced in a reaction and 20 grams of benzene are found in these aromatics, the selectivity to benzene amongst aromatic products is 20/75=26.7%. Selectivity can be calculated on a mass basis, as in the aforementioned example, or it can be calculated on a carbon basis, where the selectivity is calculated by dividing the amount of carbon that is found in a particular product by the amount of carbon that is found in a selection of products. Unless specified otherwise, for reactions involving polymers as reactants, selectivity is on a mass basis. For reactions involving conversion of a specific molecular reactant (ethene, for example), selectivity is the percentage (on a mass basis unless specified otherwise) of a selected product divided by all the products produced.

Yield—The term yield is used herein to refer to the amount of a product flowing out of a reactor divided by the amount of reactant flowing into the reactor, usually expressed as a percentage or fraction. Yields are often calculated on a mass basis, carbon basis, or on the basis of a particular feed component. Mass yield is the mass of a particular product divided by the weight of feed used to prepare that product. For example, if 500 grams of polymer is fed to a reactor and 45 grams of benzene is produced, the mass yield of benzene would be 45/500=9% benzene. Carbon yield is the mass of carbon found in a particular product divided by the mass of carbon in the feed to the reactor. For example, if 500 grams of polymer that contains 90% carbon is reacted to produce 400 grams of benzene that contains 92.3% carbon, the carbon yield is [(400*0.923)/(500*0.90)]=82.0%.

As is standard patent terminology, the term "comprising" means "including" and does not exclude additional components. Any of the inventive aspects described in conjunction with the term "comprising" also include narrower embodiments in which the term "comprising" is replaced by the narrower terms "consisting essentially of" or "consisting of." As used in this specification, the terms "includes" or "including" should not be read as limiting the invention but, rather, listing exemplary components.

DETAILED DESCRIPTION OF THE INVENTION

Figure 1:
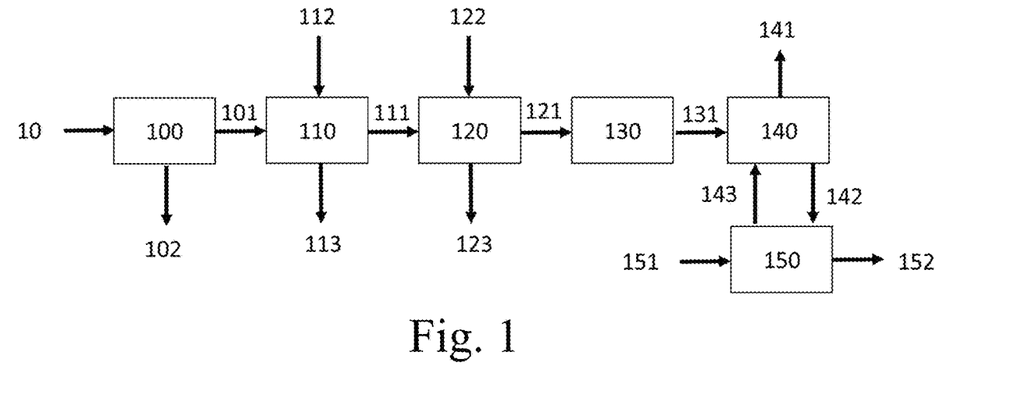
FIG. 1 presents a conceptual embodiment of the process for converting mixed plastic materials to valuable products by pyrolyzing the mixed plastics and catalytically reacting the vapor products to produce olefins, aromatics, or some combination thereof.

FIG. 1 presents a schematic of one embodiment of the inventive process for converting plastic waste to olefins and aromatics. A mixture of plastics 10 is introduced into an optional feed system 100 that prepares the plastic mixture for introduction into the process by, for example, removing undesirable feed materials 102 such as metal, minerals, halogenated materials, and the like, or sizing the material to the desired size range, or both. The steps of removal of undesirable feed materials and sizing can be conducted in any order, i.e. either step can be conducted first and the other step conducted second. The remaining plastic mixture 101 is passed to an optional washing process 110 wherein the plastic mixture may be washed for example by treatment with a wash solution 112 to remove unwanted materials such as dirt, or labels, or coatings, or the like, to produce washed plastic mixture 111 and used solution 113. The washed plastic mixture 111 is passed to pyrolysis reactor 120 with optional co-reactant 122 such as a heat transfer medium or getter or the like. In the pyrolysis reactor 120 the mixture is heated to a temperature to decompose the plastics into a product mixture comprising lighter components 121 that are in a vapor phase and heavier components 123 that are in a solid or liquid phase, or a combination of solid and liquid phases, and that include at least a portion of the materials that were introduced in the co-reactant. The vapor phase pyrolysis product mixture is passed through an optional solids removal system 130 that further removes solid particles that are entrained in the pyrolysis product vapor 121. The remaining vapor phase 131 is passed to catalytic reactor 140 while maintaining the temperature of the pyrolysis product vapor at least at the temperature of the vapor phase at which it left the optional solids separator 130 or the pyrolysis reactor 120 if no solids separator is present. The vapor phase 131 is passed to a hot catalytic reactor 140 that is charged with an aromatization catalyst effective at converting paraffins, or olefins, or both to aromatics, shown as catalytic product 141. A portion of the catalyst 142 is continuously withdrawn from reactor 140, or can be separated from the product 141, or both, and passed to catalyst regenerator 150. In catalyst regenerator 150 the catalyst is oxidized by treatment with a source of oxygen such as air 151 and the regenerated catalyst 143 is returned to reactor 140 and the combustion product gases 152 are vented or used to provide heat to the pyrolysis reactor or reactors. Catalytic product 141 can be separated into components such as ethylene, propylene, butenes, C1-c5 paraffins, benzene, toluene, xylenes, naphthalene, and other fractions in a separation scheme using conventional separation techniques.

Figure 2:
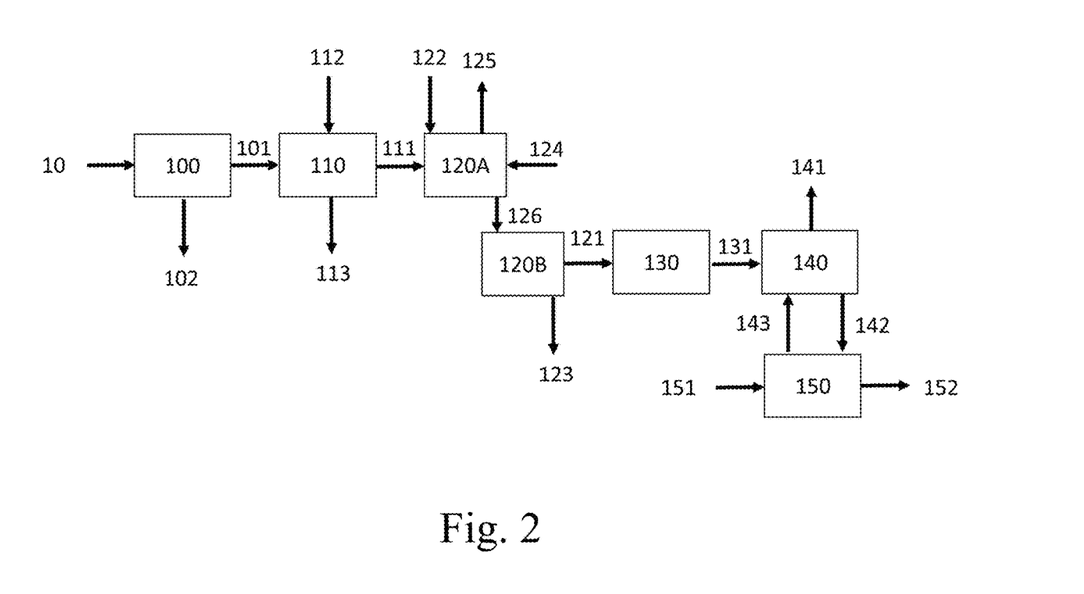
FIG. 2 presents a conceptual embodiment of the process for converting mixed plastic materials to valuable products by pyrolyzing the mixed plastics and catalytically reacting the vapor products to produce olefins, aromatics, or some combination thereof, wherein the pyrolysis is conducted in two reactors.

FIG. 2 presents a schematic of another embodiment of the inventive process for converting plastic waste to olefins and aromatics. A mixture of plastics 10 is introduced into an optional feed system 100 that prepares the plastic mixture for introduction into the process by, for example, removing undesirable feed materials 102 such as metal, minerals, halogenated materials, and the like, or sizing the material to the desired size range, or both. The steps of removal of undesirable feed materials and sizing can be conducted in any order, i.e., either step can be conducted first and the other step conducted second. The remaining plastic mixture 101 is passed to an optional washing process 110 wherein the plastic mixture may be washed for example by treatment with a wash solution 112 to remove unwanted materials such as dirt, or labels, or coatings, or the like, to produce washed plastic mixture 111 and used solution 113. The washed plastic mixture 111 is passed to pyrolysis reactor 120A with optional co-reactant 122 such as a heat transfer medium or getter or the like. In the pyrolysis reactor 120A the mixture is heated to an intermediate temperature to partially decompose the plastics, e.g. decompose PVC or PVDC to release HCl, or decompose another halogenated polymer to release HCl, HBr, or HI, or release vapors such as $NH_3$, $H_2O$, or the like. An optional inert sweep gas 124 is fed to reactor 120A to aid in the removal of vapors produced therein which are exhausted through exit port 125. With or without a sweep gas, the vapor 125 can be treated to capture or neutralize HCL and toxic materials prior to release or transfer to water treatment. The vapor 125 typically comprises at least 60% or at least 80% $H_2O$, and may contain HCl, halogenated carbon compounds, and other species more volatile than molten polymers. The condensed phases 126 are passed to a second pyrolysis reactor 120B where they are heated to decompose into a product mixture comprising lighter components 121 that are in a vapor phase and heavier components 123 that are in a solid or liquid phase, or a combination of solid and liquid phases, and that include at least a portion of the materials that were introduced in the co-reactant, or co-reactant can be fed directly to the second pyrolysis reactor (not shown). The vapor phase pyrolysis product mixture is passed through an optional solids removal system 130 that further removes solid particles that are entrained in the pyrolysis product vapor 121. The remaining vapor phase 131 is passed to catalytic reactor 140 while maintaining the temperature of the pyrolysis product vapor at least at the temperature of the vapor phase at which it left the optional solids separator 130 or the pyrolysis reactor 120 if no solids separator is present. The vapor phase 131 is passed to a hot catalytic reactor 140 that is charged with an aromatization catalyst effective at converting paraffins, or olefins, or both to aromatics, shown as catalytic product 141. A portion of the catalyst 142 can be continuously withdrawn from reactor 140, or can be separated from the product 141, or both, and passed to catalyst regenerator 150. In catalyst regenerator 150 the catalyst is oxidized by treatment with a source of oxygen such as air 151 and the regenerated catalyst 143 is returned to reactor 140 and the combustion product gases 152 are vented or used to provide heat to the pyrolysis reactor or reactors. Catalytic product 141 can be separated into components such as ethylene, propylene, butenes, C1-C5 paraffins, benzene, toluene, xylenes, naphthalene, and other fractions in a separation scheme using conventional separation techniques.

Combustible gases such as methane, ethane, propane, butanes, CO and H2, optionally, can be recovered from vapor stream 125 or recovered from the gases produced in the catalytic pyrolysis in the fluidized bed reactor. Combustible gases can provide heat for the process. Heat in reactor 120A may also be provided by pressure/friction and/or other heat sources such as resistive or inductive heating.

In some embodiments, for example when recycled polymeric materials are used, impurities may optionally be removed from the feed composition prior to being fed to the reactor, e.g., by an optional separation step such as 100 in FIG. 1 or FIG. 2. In some instances, the separation step may include mechanical separation, sink/float separation, air elutriation, or other known separation processes, preferably in an automated mode. In some instances, the particle size of the solid polymer feed composition may be reduced in a size reduction system as part of 100 prior to passing the feed to the pyrolysis reactor. In some embodiments, the average diameter of the reduced size feed composition exiting the size reduction system may comprise no more than about 50%, not more than about 25%, no more than about 10%, no more than about 5%, no more than about 2% of the mass average diameter of the feed composition fed to the size reduction system. The feed mixture may comprise plastics mixtures in which at least 85% by mass, or at least 90% by mass, or at least 95% by mass of the particles pass through a 0.25 inch (0.6 cm), or 0.5 inch (1.2 cm), or 1.0 inch (2.5 cm), or 1.5 inch (3.7 cm), or 2 inch (5.0 cm), or 4 inch (10.0 cm) screen. Average diameter (size) can be measured by sieving through mesh (screen). Large-particle feed material may be more easily transportable and less difficult to process than small-particle feed material. On the other hand, in some cases it may be advantageous to feed small particles to the reactor. The use of a size reduction system allows for the transport of large-particle feed between the source and the process, while enabling the feed of small particles to the reactor.

The feed materials suitable for use in the invention can comprise all types of polymeric materials including polyethylene (PE), polypropylene (PP), polyacetylene, polybutylene, polyolefins, polyethylene terephthalate (PET), polybutylene terephthalate, polyester, copolyesters, polycarbonate, polyurethanes, polyamides, polystyrene (PS), polyacetal, epoxies, polycyanurates, polyacrylics, polyurea, vinyl esters, polyacrylonitrile, polyamide, polyurethane, polyethers, polycarbonates, poly(oxides), poly(sulfides), polyarylates, polyetherketones, polyetherimides, polysulfones, polyurethanes, polyvinyl alcohol, polyvinylchloride (PVC), polyvinyl dichloride (PVDC), polyvinyl acetate, nylon, copolymers such as ethylene-propylene, acrylonitrile-butadiene-styrene (ABS), nitrile rubber, natural and synthetic rubber, tires, styrene-butadiene, styrene-acrylonitrile, styrene-isoprene, styrene-maleic anhydride, ethylene-vinyl acetate, nylon 12/6/66, filled polymers, polymer composites, plastic alloys, other polymeric materials, and polymers or plastics dissolved in a solvent, whether obtained from polymer or plastic manufacturing processes as waste or discarded materials, post-consumer recycled polymer materials, materials separated from waste streams such as municipal solid waste, and polymers produced by polymerization of monomers, such as, for example, dienes, olefins, styrenes, acrylates, acrylonitrile, methacrylates, methacrylonitrile, diacids and diols, lactones, diacids and diamines, lactams, vinyl esters, block copolymers thereof, and alloys thereof; thermoset polymers such as, for example, epoxy resins; phenolic resins; melamine resins; alkyd resins; vinyl ester resins; unsaturated polyester resins; crosslinked polyurethanes; polyisocyanurates; crosslinked elastomers, including but not limited to, polyisoprene, polybutadiene, styrene-butadiene, styrene-isoprene, or some combination of these. The invention includes subcombinations of these materials, as desired, or as available from a particular location; the invention can be described as comprising one or any combination of these materials.

In any of the methods, the pyrolysis reactor 120, or 120A, or 120B, or more than one of these, can be a moving bed reactor wherein the feed material is impelled along the length of the reactor by mechanical or gravitational means or both mechanical and gravitational means. Typical examples of reactors suitable for the pyrolysis reactor 120, 120A, and 120B include a 1-screw extruder, 2-screw extruder, auger reactor, rotating kiln reactor, or stepped grate reactor. In any of the embodiments the pyrolysis reactor has a means of separating condensed materials such as solids or liquids or both from vapor products and an outlet for the condensed phases separate from the outlet for the vapor phase. In any of the embodiments the pyrolysis reactor may have multiple heating zones with successively higher temperatures in later zones. In some embodiments the pyrolysis reactor is fitted with a gas outlet at an area of the reactor where the temperature of the materials in the reactor is less than 300 C or between 250 C and 300 C to allow for the removal of products produced at low temperatures such as steam, HCl, NH3, or other materials from the reactor. In one embodiment a separating screen is fitted within the pyrolysis reactor immediately downstream of the gas outlet to at least partially prevent gases evolved at low temperature from passing along with the molten and solid materials into the hotter portions of the reactor. In one embodiment a gas inlet for the introduction of hot inert or recycle gas such as a gas comprising any of CH4, H2, CO, CO2, and C2-C4 paraffins or olefins, or a mixture, is fitted immediately downstream of the gas vent and optional screen.

In some embodiments the pyrolysis reactor comprises two or more reactors, 120A and 120B etc., in series, wherein the feed is heated to a temperature between 250 C and 300 C in the first reactor 120A, the hot condensed phases, i.e. solids and liquids, are passed from the first to the second reactor 120B, and the vapors are exhausted without entering the second reactor. Optionally solid co-reactants 122 can be fed to pyrolysis reactor 120B in place of, or in addition to, being fed to pyrolysis reactor 120A.

Where an auger reactor is utilized, embodiments of this invention include helical augers that optionally have different pitch dimensions at different portions of the auger in order to adjust the velocity of the condensed phases from the entry to the exit of the reactor. In this embodiment the flight thickness and shaft diameter may also be of variable dimension along the length of the auger in order to control the flow velocity of the vapor and condensed phases. Augers with paddles, or cuts, or folded flights are also envisioned as within the scope of these embodiments.

In embodiments wherein a rotating kiln reactor is utilized, the kiln cylinder can be fitted with lifters, such as helical lifters attached to the cylinder wall or tabular lifters, folded lifters, or segmented lifters extending from the cylinder wall. A rotating kiln reactor as envisioned herein can also be inclined either up or down towards the exit end of the kiln depending on the desired residence time and flow velocity desired for the condensed phases within the kiln, thus taking advantage of gravity to control residence time of the condensed phases. It is also envisioned that the rotation rate of the rotating kiln reactor can be adjusted as desired, for example between 20 revolutions per minute to 0.2 revolution per minute depending on the nature of the feed mixture and the co-reactant added in order to provide thorough mixing and high heat transfer. A rotating kiln reactor as envisioned in these embodiments can be heated externally with combustion of waste process gases such as CH4, C2-C4 paraffins, H2, CO, and the like recycled from the product separation or natural gas or electrically.

In any of the embodiments the temperature profile within the pyrolysis reactor can range from a lower temperature near the feed entry port to a higher temperature at the exit port or ports. The range of temperatures can be from 20 C to 225 C, such as 20 to 100 C, or 20 to 50 C, at or near the inlet port, and the range of temperatures at the high temperature exit port can be from 300 C to 700 C, such as from 325 to 650 C, or from 350 to 600 C.

In embodiments wherein a solid co-reactant is fed to the pyrolysis reactor the solid co-reactant material is optionally transferred to a combustion regenerator wherein the carbonaceous materials are reacted with air and at least a portion of the hot solid co-reactant material is returned to the pyrolysis reactor. In one embodiment of the invention the hot flue gas exiting the solid co-reactant regenerator is passed to a catalyst heater to heat the catalyst for the catalytic pyrolysis reactor.

In some embodiments the vapor exiting the pyrolysis reactor or reactors can be passed through a filter to remove fine materials or to trap compounds such as $NH_3$, $H_2S$, or COS, or metal vapors such as Hg, that could poison the catalyst in the catalytic reactor. These could be a mesh filter and/or an absorbent particle bed such as activated carbon.

In any of the methods the vapors exiting the pyrolysis reactor can be passed through an optional solids separation device such as a cyclone or screen to remove entrained solids while maintaining the temperature of the vapor at a temperature at least as high as the temperature of the vapor at the exit of the pyrolysis reactor, i.e. the vapors are not permitted to cool significantly before being passed to the catalytic pyrolysis reactor. After leaving the anerobic pyrolysis reactor 120A, the vapor product preferably does not contact any cool surfaces that could condense products, and the surfaces are preferably maintained at a temperature of at least 300 C, at least 325, or at least 350 C or within 25 or 50 C of the temperature exiting the reactor 120A. Preferably, in any of the embodiments, the temperature of the vapor is maintained at a temperature at least 2 C, or at least 3 C, or at least 5 C, or at least 10 C higher than the temperature of the vapor at the exit end of the pyrolysis reactor.

In any of the methods, the catalytic reactor 140 can be a fluidized bed reactor; wherein the catalyst is a solid catalyst and the step of catalytically pyrolyzing comprises pyrolyzing in the presence of the solid catalyst in a fluidized bed reactor to produce a fluid product stream 141 and used catalyst with coke 142; and wherein at least 95% the carbon in the vapor feed is converted to coke and volatile products; and at least a portion of the used catalyst with coke is transferred to a regenerator 150 where the coke is reacted with oxygen or air to form hot regenerated catalyst, and returning at least a portion of the hot regenerated catalyst 143 to the fluidized bed reactor, wherein heat from the hot regenerated catalyst provides energy to the step of pyrolyzing.

In any of the methods, the step of catalytically pyrolyzing may comprise pyrolysis in the presence of a fluid bed catalyst. The catalytic pyrolysis reactor may comprise a fluidized bed, circulating bed, bubbling bed, or riser reactor operating at a temperature in the range from 300° C. to 800° C., or from 350° C. to 750° C., or from 400° C. to 700° C., or from 450° C. to 650° C., or from 500° C. to 600° C. The residence time of the vapors in the catalytic pyrolysis can be from 1 second to 480 seconds, or from 1 second to 240 seconds, or from 2 seconds to 60 seconds, or from 3 seconds to 30 seconds, or from 4 seconds to 15 seconds. The pressure of the catalytic pyrolysis reactor can be at least 0.1 MPa (1 bar), or at least 0.3 MPa (3bar), or at least 0.4 MPa (4 bar), or from 0.1 to 2.0 MPa (1 to 20 bar), or from 0.1 to 1.0 MPa (1 to 10 bar), or from 0.3 to 0.8 MPa (3 to 8 bar), preferably from 0.4 to 0.6 MPa (4 to 6 bar), pressures are absolute pressures.

Design and conditions of the fluidized bed reactor can be those conventionally known. A fluidization gas may be needed at start-up; during steady-state operation, fluidization gas may comprise a portion of the vapor stream 126 that, optionally, can be piped into the bottom of the fast catalytic pyrolysis fluidized bed reactor. Recycle gas from the process may be used as fluidizing gas.

For catalytic pyrolysis, useful catalysts include those containing internal porosity selected according to pore size (e.g., mesoporous and pore sizes typically associated with zeolites), e.g., average pore sizes of less than 10 nm, less than 5 nm, less than 2 nm, less than 1 nm, less than 0.5 nm, or smaller. In some embodiments, catalysts with average pore sizes of from 0.5 to 10 nm may be used. In some embodiments, catalysts with average pore sizes of between 0.5 and 0.65 nm, or between 0.59 and 0.63 nm may be used. In some cases, catalysts with average pore sizes of between 0.7 and 0.8 nm, or between 0.72 and 0.78 nm may be used.

The catalyst composition particularly advantageous in the catalytic pyrolysis fluidized bed reactor of the present invention comprises a crystalline molecular sieve characterized by an SAR (silica to alumina, $SiO2:Al2O3$ mass ratio) greater than 12, or from 12 to 240, and a CI (constraint index) from 1 to 12. Non-limiting examples of these crystalline molecular sieves are those having the structure of ZSM-5, ZSM-11, ZSM-12, ZSM-22, ZSM-23, ZSM-35, ZSM-48, ZSM-50, or combinations thereof. As an embodiment, the catalyst composition comprises a crystalline molecular sieve characterized by an SAR from greater than 12 to 240 and a CI from 5 to 10, such as, for example, molecular sieves having the structure of ZSM-5, ZSM-11, ZSM-22, ZSM-23 or combinations thereof. The method by which CI is determined is described more fully in U.S. Pat. No. 4,029,716, incorporated herein by reference for details of the method.

The molecular sieve for use herein or the catalyst composition comprising same may be thermally treated at high temperatures. This thermal treatment is generally performed by heating at a temperature of at least 370° C. for at least 1 minute and generally not longer than 20 hours (typically in an oxygen containing atmosphere, preferably air). While subatmospheric pressure can be employed for the thermal treatment, atmospheric pressure is desired for reasons of convenience. The thermal treatment can be performed at a temperature up to about 925° C. The thermally treated product is particularly useful in the present process.

For the catalyst compositions useful in this invention, the suitable molecular sieve may be employed in combination with a support or binder material such as, for example, a porous inorganic oxide support or a clay binder. Non-limiting examples of such binder materials include alumina, zirconia, silica, magnesia, thoria, titania, boria, and combinations thereof, generally in the form of dried inorganic oxide gels and gelatinous precipitates. Suitable clay materials include, by way of example, bentonite, kieselguhr, and combinations thereof. The relative proportion of suitable crystalline molecular sieve of the total catalyst composition may vary widely with the molecular sieve content ranging from 30 to 90 percent by weight and more usually in the range of 40 to 70 percent by weight of the composition. The catalyst composition may be in the form of an extrudate, beads or fluidizable microspheres.

The molecular sieve for use herein or the catalyst composition comprising it may have original cations replaced, in accordance with techniques well known in the art, at least in part, by ion exchange with hydrogen, or hydrogen precursor cations, or non-noble metal ions of Group VIII of the Periodic Table, i.e. nickel, iron or cobalt, or zinc, or gallium, or combinations thereof.

In processes in which catalyst from the catalytic pyrolysis is regenerated, heat is generated by the oxidation of coke, char, and other materials in a catalyst regenerator for use in the process, or for conversion to electricity for export. In one set of embodiments, an oxidizing agent is fed to the regenerator via a stream shown as 151 in FIG. 1. The oxidizing agent may originate from any source including, for example, a tank of oxygen, atmospheric air, steam, among others. In the regenerator, the catalyst is re-activated by reacting the catalyst with the oxidizing agent and heat is generated. A solid mixture comprising deactivated catalyst may comprise residual carbon and/or coke as well as coke or char from the process, which may be removed via reaction with the oxidizing agent in the regenerator. In some embodiments a portion of the gaseous products from the catalytic pyrolysis process is fed to the catalyst regenerator to be combusted with the solid materials. The gaseous products may be first separated into an olefin rich stream and an olefin poor stream and at least a portion of the olefin poor stream may be fed to the catalyst regenerator. The regenerator in FIG. 1 comprises a vent stream 152 which may include regeneration reaction products, residual oxidizing agent, etc.

In some embodiments of the process at least a portion of the non-vapor materials 123 that are removed from pyrolysis reactor 120 may be recycled to the feed of pyrolysis reactor 120 as a portion of the optional co-reactant 122. In some embodiments of the process, the optional co-reactant 122 may comprise solid materials that react with sulfur or nitrogen compounds to trap the sulfur or nitrogen species in the solid phase. The solid materials in the optional co-reactant 122 can comprise one or more materials chosen from among agricultural lime, calcium oxide, calcium hydroxide, magnesium oxide, magnesium hydroxide, limestone, or hydrotalcites, or some combination thereof.

Examples 1 Through 10

Figure 3:
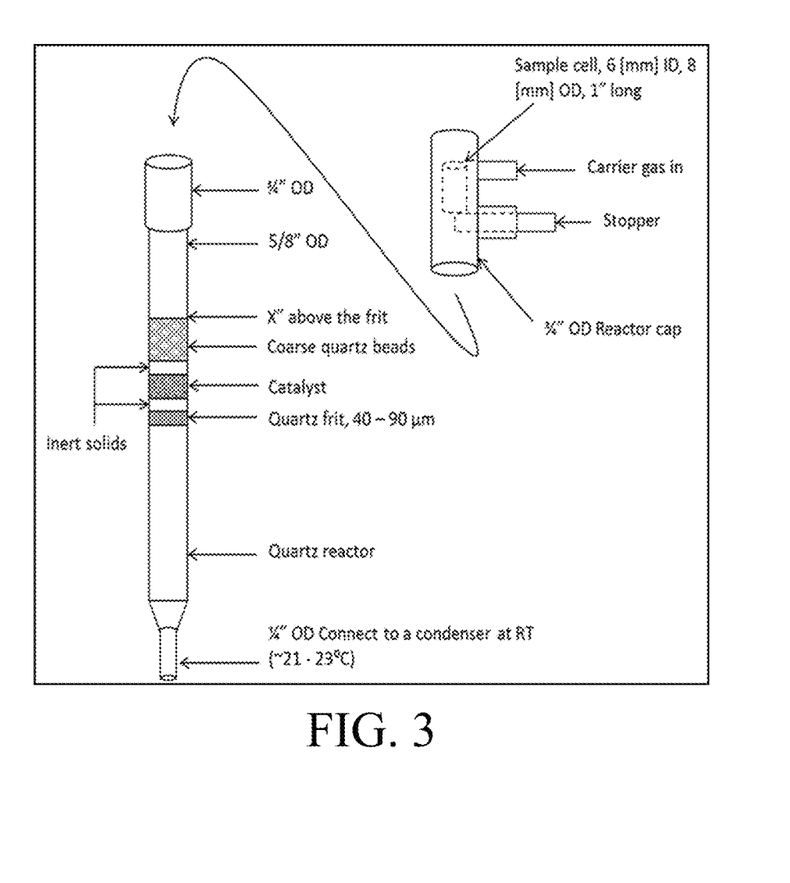
FIG. 3 shows a drawing of the reactor used in the Examples.

The drop-tube reactor for two-step chemical conversion of plastics comprises a quartz reactor tube (ACE Glass) containing a quartz frit (40-90 μm) fused into the center of the tube. FIG. 3 shows the configuration of the drop-tube reactor. A sample cell (10 mm OD, 8 mm ID, 25 mm length, quartz, made by TGP) is used to contain the feedstock using two pieces of quartz wool (TGP). As illustrated in FIG. 3, the sample cell was placed in a reactor cap (borosilicate, ACE Glass) and was held by a stopper (¼ inch (6 mm) aluminum rod, McMaster). The reactor cap and the quartz reactor were then assembled and installed onto the fixed-bed reactor system. The bottom of the reactor was connected to a condenser (borosilicate) filled with perforated stainless steel packing (ACE Glass) immersed in an ice-water bath (0° C.). A heating mantle was applied between the reactor bottom and the condenser top to prevent any condensation before the condenser. During the reaction, the heating mantle was set at 210° C.

In the reactor, a small sample of ZSM-5 catalyst (1.5 g) was placed on top of the quartz frit. Feedstock (100 mg for each run) was sealed in a sample cell with the quartz wool. The catalyst/feedstock weight ratio was about 15. Prior to dropping the contents of the sample cell into the reactor, the catalyst was calcined at 550° C. under 100 mL/min air flow for 20 min (ramping rate=12° C./min). After calcination, the reactor was cooled to reaction temperature (500° C.). During the cool-down, the condenser was filled with 10 mL of solvent (ethyl acetate for plastics conversion, and acetone for biomass conversion) and held for 10 min for temperature lineout. The reactor system was then purged with helium flow at 75 mL/min for 20 min to remove air and to purge the gas collection lines. The sample cell containing the feed material was dropped into the reactor by pulling out the stopper rod to initiate the reaction.

A hold period of 10 min allowed the reaction to complete. Gas products, consisting mostly of permanent gases and $C_1$-$C_3$ olefins and paraffins were collected in a gas bag. Liquid products (mostly $C_{4+}$) were collected in the condenser. After reaction the temperature was increased to 650° C. without gas flow. Solid products, including coke and char remaining in the reactor, were then burned at 650° C. for 10 min under 50 mL/min air flow. The gas products during burning were collected in a second gas bag. An additional 3 mL of solvent was added to the condenser to extract any products remaining on the top of the condenser. All of the liquid in the condenser was then transferred to a 20 mL sample vial. A weighed amount of internal standard (dioxane, typically 3000-5000 mg, Sigma-Aldrich) was added to the sample vial. The condenser was washed with acetone and was dried in a drying oven. It is noted that a small amount of liquid was retained in the condenser due to holdup on the packing. Therefore, the weight of the condenser with and without liquid products was measured to obtain the total amount of liquid products. Liquid samples were analyzed by a GC-FID (gas chromatograph with flame ionization detector from Shimadzu 2010Plus) for hydrocarbons and oxygenates. Gas bag samples were analyzed using an Agilent GC 7890B gas chromatograph.

The results of the experiments for various feeds are presented in TABLE 2. The balances of the products unaccounted for in TABLE 2 comprise water, inert solids, and minor components not readily recovered for combustion.

Examples 1 through 11 show that the two-step pyrolysis followed by catalytic pyrolysis produces high yields of olefins and aromatics from plastics. The yield of olefins is at least 2% in all cases, and the yield of BTX is at least 10.08% in all cases. Examples 1, 2, 3, 4, and 9 show that for polymers that do not contain fillers (tires) or heteroatoms (PET, nylon), the yield of BTX is at least 32.88%, the yield of olefins is at least 5.58%, and the yield of coke and char is less than 5%, and often less than 2% of the mass of the feed. The yield of olefins for two-step pyrolysis/catalysis for polyolefins (Examples 1, 2, 3, and 4) is at least 10.43%, and the yield for linear, non-branched polyolefins (Examples 1, 2, and 3) is at least 17.25%. The yield of aromatics for two-step pyrolysis/catalysis for polyolefins (Examples 1, 2, 3, and 4) is at least 32.88%, and the yield for linear, non-branched polyolefins (Examples 1, 2, and 3) is at least 45.6%.

TABLE 2

Products of catalytic pyrolysis of various materials with ZSM-5 catalyst in drop tube experiments. All values are weight percent.

| Example | Feed | BTX | Other C5 + Liquid | Coke and Char | Olefins | Paraffins | H2 | CO | CO2 | Ash | Total |
|---|---|---|---|---|---|---|---|---|---|---|---|
| 1 | Polyethylene (PE) | 52.8 | 3.5 | 0.9 | 18.1 | 16.4 | 2.6 | 0.3 | 0.3 | 0 | 94.8 |
| 2 | Polypropylene (PP) | 45.6 | 4.0 | 0.7 | 21.5 | 16.5 | 2.4 | 0 | 0.2 | 0 | 90.8 |
| 3 | High Density Polyethylene (HDPE) | 53.05 | 3.47 | 1.05 | 17.25 | 18.53 | 2.7 | 0 | 0.21 | 0 | 96.3 |
| 4 | Isoprene | 32.88 | 10.03 | 1.29 | 10.43 | 5.89 | 1.29 | 0 | 0.28 | 0 | 62.1 |
| 5 | Tire Sidewall | 14.94 | 3.13 | 21.62 | 8.25 | 2.08 | 0.9 | 0.56 | 0.95 | 7.0 | 59.4 |
| 6 | Tire Tread | 13.9 | 2.99 | 20.37 | 7.53 | 2.12 | 0.94 | 0.25 | 0.8 | 7.0 | 55.9 |
| 7 | PET | 23.73 | 3.92 | 17.76 | 4.98 | 1.16 | 0.38 | 7.65 | 34.13 | 0 | 93.7 |
| 8 | PET Clothing | 23.06 | 4.12 | 16.96 | 2.17 | 1.3 | 0.38 | 7.37 | 31.67 | 0 | 87.0 |
| 9 | Polystyrene (PS) | 38.51 | 36.29 | 4.13 | 5.58 | 1.49 | 0.48 | 0 | 0.33 | 0 | 86.8 |

What is claimed:

1. A method for producing olefins and aromatics comprising;
   feeding a stream comprising plastics to a first pyrolysis reactor, wherein the first pyrolysis reactor comprises a mechanically or gravitationally induced moving bed;
   anaerobically pyrolyzing the stream in the first reactor at a temperature above 350° C.;
   preparing a raw, vapor product;
   wherein the temperature of the raw, vapor product exits the first reactor at a first temperature;
   passing the raw, vapor product produced in the first pyrolysis reactor, while maintaining the temperature of the vapor at a temperature that is at least 2° C. higher than the first temperature, to a second reactor that comprises a fluidized bed fitted with a catalyst;
   catalytically reacting the vapor product from the pyrolysis with the catalyst in the fluidized bed reactor to form a product vapor mixture; and
   recovering olefins, or aromatics, or some combination thereof from the product vapor mixture.

2. The process of claim 1 wherein the first pyrolysis reactor comprises a moving bed, one-screw extruder, two screw extruder, auger reactor, rotating kiln reactor, or a stepped grate reactor.

3. The process of claim 2 wherein the first reactor comprises an inlet port and an exit port wherein the temperatures range from 20° C. to 225° C. at or near the inlet port, and a range of temperatures at the exit port range from 300° C. to 700° C.

4. The process of claim 1 wherein the first pyrolysis reactor comprises two or more reactors in series.

5. The process of claim 4 wherein the feed stream is heated to a temperature between 250 and 300° C. in the first pyrolysis reactor and condensed phases are passed to a second pyrolysis reactor.

6. The process of claim 1 wherein an inert gas is fed to the first pyrolysis reactor.

7. The process of claim 1 wherein a solid co-reactant material is fed to the first pyrolysis reactor.

8. The process of claim 7 wherein the solid co-reactant material is transferred to a combustion regenerator wherein the carbonaceous materials are reacted with air and at least a portion of the hot solid co-reactant material is returned to the first pyrolysis reactor.

9. The process of claim 7 wherein the solid co-reactant fed to the first reactor comprises agricultural lime, calcium oxide, calcium hydroxide, magnesium oxide, magnesium hydroxide, limestone, hydrotalcites, or some combination thereof.

10. The process of any of claims 2, 3, 6, 7 and 8 wherein the catalyst in the fluidized bed reactor comprises a zeolite.

11. The process of any of claims 2, 3, 6, 7 and 8 wherein the feed stream of plastics is first heated to at least 200° C. to achieve a molten state and filtered to remove solids.

12. The process of any of claims 2, 3, 6, 7 and 8 wherein the product vapor mixture from the fluidized bed catalytic reactor comprises at least 20 mass % BTX.

13. The process of any of claims 2, 3, 6, 7 and 8 wherein the product vapor mixture is passed through one or more solids separation devices.

14. The process of claim 13 wherein catalyst in the fluidized bed catalytic pyrolysis reactor is withdrawn and regenerated by oxidation with air in a regenerator, and returned to the catalytic pyrolysis reactor.

15. The process of claim 14 wherein heat recovered from the catalyst regenerator is used to heat the feed materials, the first pyrolysis reactor or the catalytic pyrolysis in the fluidized bed reactor, or some combination thereof.

16. The process of claim 14 wherein the product vapor mixture comprises CH4 and C2-C4 paraffins; and wherein 50 to 100 mass % of the CH4 and C2-C4 paraffins is combusted in the regenerator.

17. The process of claim 13 wherein the product vapor mixture from the fluidized bed catalytic reactor comprises at least 20 mass % olefins.

18. The process of claim 1 wherein mass yield of BTX in the product vapor mixture from the catalytic conversion is at least 30% BTX based on mass in the stream.

19. The process of claim 18 wherein benzene, toluene, or xylenes are separated from the product vapor mixture.

20. The process of any of claims 2, 3, 6, 7 and 8 wherein at least a portion of the aromatic products in the product vapor mixture is hydrogenated to produce naphthenes.

21. The process of claim 1 wherein the first pyrolysis is initially conducted by heating the feed to a temperature between 250 and 300° C., held at that temperature while vapors are removed, and then the molten plastic waste is further pyrolyzed at higher temperature.

22. The process of any of claims 2, 3, 6, 7 and 8 wherein the feedstock comprises a mix of waste plastic chosen from among polyethylene terephthalate (PET), high density polyethylene (HDPE), polyvinyl chloride (PVC), polyvinylidene (PVCD), low density polyethylene (LDPE), polypropylene (PP), polystyrene (PS), mixed resins, or some comnination thereof.

23. The process of any of claims 2, 3, 6, 7 and 8 wherein the catalyst in the fluidized bed reactor comprises ZSM-5.

* * * * *